INVENTOR.
Albert T. Potter
BY
Francis D. Hardesty
ATTORNEY.

Patented Oct. 8, 1929

1,730,899

UNITED STATES PATENT OFFICE

ALBERT T. POTTER, OF DETROIT, MICHIGAN, ASSIGNOR, BY MESNE ASSIGNMENTS, TO AINSWORTH MANUFACTURING CORPORATION, OF DETROIT, MICHIGAN, A CORPORATION OF MICHIGAN

WINDSHIELD OPERATOR

Application filed April 30, 1927. Serial No. 189,189.

The present invention relates to closure operators and particularly to operating devices for the hinged windshields of automobiles.

Among the objects of the invention is to provide a device of the character indicated which shall be simple and efficient in construction and operation.

Another object is a device of this character which shall permit ready adjustment to take up wear and also provide suitable means permitting proper lubrication.

Other objects will readily occur to those skilled in the art upon reference to the following description and accompanying drawing in which:—

Figures 1, 2:
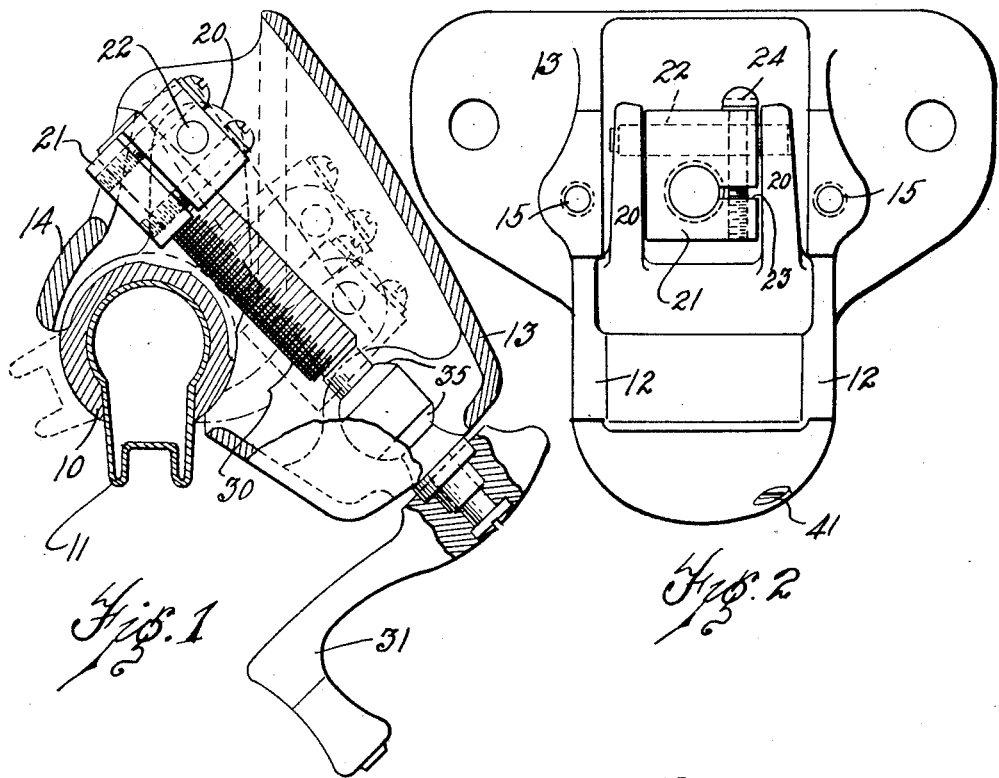
Fig. 1 is a vertical section through a preferred form of the device.
Fig. 2 is a rear elevation with the cover plate removed.
Figure 3:
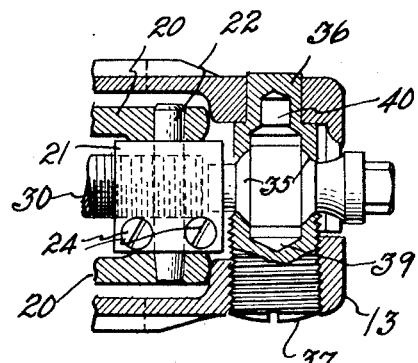
Fig. 3 is a partial cross section, horizontal with respect to Fig. 2, through the shaft bearing.

The preferred form of operator consists of a member 10 whose general form is cylindrical but is slotted along one side and hollowed to embrace a windshield frame member 11. Member 10 has bearings at either end to coact with bearing portions 12 in the housing 13 and is held in place by a plate 14 also provided with bearing portions and secured to the housing in any suitable manner, as by screws in screw holes 15.

Member 10 has also a pair of laterally projecting arms 20 which embrace a traveling nut 21, the nut being hinged or pivoted to the arms as by pin 22. Nut 21 is preferably split as at 23 and adjustable in size as by screws 24.

Mounted in the housing 13 is a threaded shaft 30 fixed against longitudinal movement and provided with a crank handle 31. Shaft 30 is threaded into nut 21 so that rotation of the shaft will cause the nut to move longitudinally and through arms 20 cause tilting of the member 10 in its bearings and thereby the tilting of the windshield (not shown) carried in frame 11.

As the arms 20 are an integral part of or are fixed to member 10, rotation of the shaft 30 will cause the nut 21 to move not only longitudinally of the shaft but also laterally with respect to the shaft. Therefore, provision must be made for the shaft to swing in a vertical plane as is indicated by the dotted line positions of the parts in Fig. 1.

The present device permits this movement by mounting the shaft 30 as shown. The shaft is provided near the crank end with a spherical bearing and this may be, as in the form shown, two zones 35 with the cylindrical shaft portion between. This spherical bearing portion of shaft 30 co-operates with the correspondingly shaped inner end of a pin 36, set in one side wall of housing 13 and a screw 37 in the opposite side-wall and in axial alignment with the pin. The inner ends of pin 36 and screw 37 are preferably bored axially for a short distance as at 39 and 40 so as to furnish grease reservoirs, and the screw 37 is preferably fixed in adjusted position by means of a set screw 41.

This universal joint form of bearing for the shaft 30 permits the shaft 30 to swing freely in a vertical plane and provides a readily adjustable bearing with considerable bearing surface and one which presents no difficulties in alignment.

Having now described the invention and the preferred form of embodiment thereof, it is to be understood that the said invention is to be limited, not to the specific details herein given but only by the scope of the claims which follow.

I claim:—

1. A windshield operator comprising a housing, a member secured to the windshield and rotatably mounted in housing, an arm on said member within said housing, and having pivotally secured thereon a traveling nut, a threaded shaft mounted in said housing and adapted to be rotated to move said nut, the mounting of said shaft in said housing comprising a spherical bearing portion on said shaft and correspondingly shaped bearing portions in the side walls of said housing, at least one of said latter portions being movable toward and away from said shaft.

2. A windshield operator comprising a housing, a member secured to the windshield and rotatably mounted in housing, an arm on said member within said housing and having pivotally secured thereon a traveling nut, a threaded shaft mounted in said housing and adapted to be rotated to move said nut, the mounting of said shaft in said housing comprising a spherical bearing portion on said shaft and correspondingly shaped bearing portions in the side walls of said housing, the latter being provided with chambers for lubricant for the bearing surfaces.

ALBERT T. POTTER.